Dec. 18, 1923.  
A. SABROE  
MILKING MACHINE  
Filed April 20, 1923

1,477,978

Patented Dec. 18, 1923.

1,477,978

UNITED STATES PATENT OFFICE.

AXEL SABROE, OF HADERSLEV, DENMARK.

MILKING MACHINE.

Application filed April 20, 1923. Serial No. 633,498.

*To all whom it may concern:*

Be it known that I, AXEL SABROE, a subject of the King of Denmark, and residing at Haderslev, Denmark, have invented certain new and useful Improvements in Milking Machines, of which the following is a specification.

This invention relates to improvements in milking machines of the suction type and in which each single milking cup to be applied to the cow teats is in connection with a cylinder to which also the suction pipe is connected, the passage-way which connects said cylinder with the milking cup being controlled by means of a diaphragm acted upon by the atmospheric pressure through the medium of a plunger in said cylinder, or by the own weight of the latter respectively, and thereby held in closed position when the milk supply to said cylinder has ceased. The plunger is then automatically operated for re-opening said passage-way as soon as the milk supply begins afresh or air is admitted through a small hole in the milking cup thereby neutralizing the vacuum therein. Thereby, said passage-way is alternately closed and opened and thus the reciprocating motion of the plunger with the diaphragm is produced, which is of great advantage for the suction upon the cow teats.

The main object of the present invention, above the known art disclosing holding means for said diaphragm, lies in the fact that the diaphragm is not kept in stretched position but securely held in place only at its thickened edges in such a way that it can freely operate within its working space bounded by an upper and a lower annular inclined plane forming the upper and lower bearing surfaces for said diaphragm, whereby a deformation and extension of the latter is impossible and its action remains always uniform for a very long time.

The accompanying drawing represents in Figs. 1 to 4 incl. longitudinal central sections of the lower part of differently constructed milking cups embodying the improved arrangement.

Figure 1:
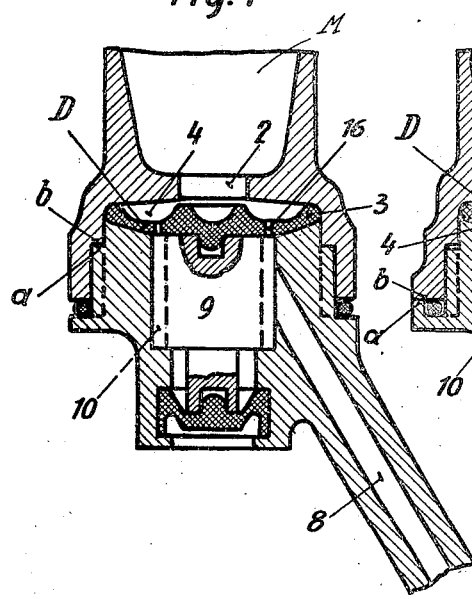
Figure 2:
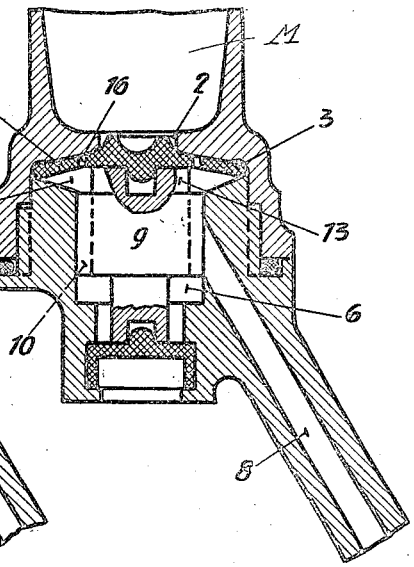
Figure 3:
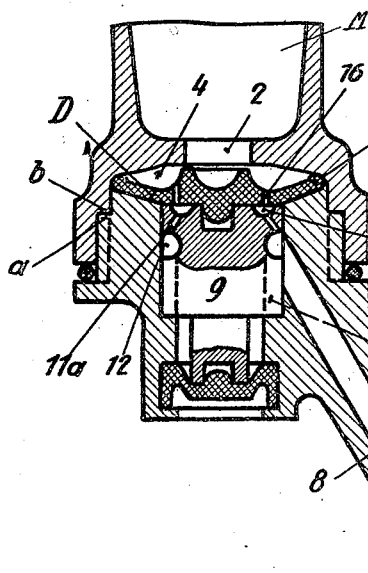
Figure 4:
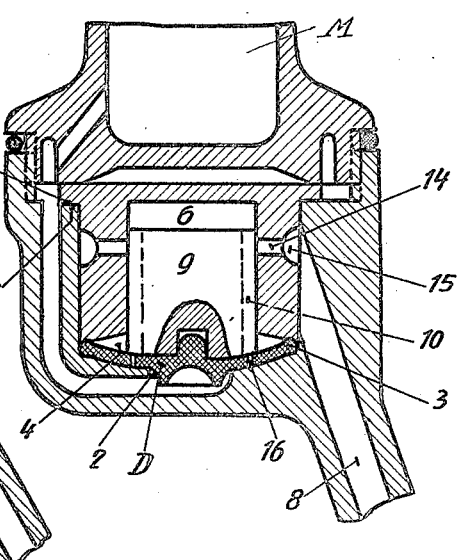

The construction shown in Fig. 4 is used when the diaphragm is to shut-off the milk supply by the own weight of the plunger 9, on the contrary to the constructions shown in Figs. 1, 2 and 3, in which the diaphragm is to shut-off the milk supply by atmospheric pressure.

As shown in the illustrations, two butt-ends $a$, $b$ on detachable parts of the arrangement enclosing said cylinder 6 serve for securely holding the thickened attachment border 3 of the diaphragm D in place, while the working space 4 of the latter is bounded by an upper and a lower annular inclined plane forming part of the milking cup M and of said cylinder 6 respectively and serving as the upper and lower bearing surfaces for said diaphragm. Thereby, an undue extension and consequent deformation of the diaphragm D is prevented.

That part of the diaphragm, which faces the plunger cylinder 6, or the valve-seat 2 respectively, is provided with a strengthening, in order not only to prevent an extension of said diaphragm part which does not bear upon the inclined planes, but also to attain a higher durability of the same.

In the middle of said strengthened diaphragm part, a guide-knob is provided in a way known in the art, which engages in a depression of the plunger 9; or, vice versa, a depression may be provided in the diaphragm and a guide-knob on the plunger.

In order to further neutralise the strain, to which the diaphragm is exposed by the alternate pressure from both sides, the diaphragm is provided with one or a plurality of small orifices 16, through which the suction, or the milk respectively, is led. Said orifices must, for their proper action, be located beyond the middle part of the diaphragm that is to close the valve opening, but within the plunger circumference that is larger than the valve opening.

The suction pipe (not shown) is connected through the channel 8 with the plunger cylinder 6, and the plunger 9 is provided with longitudinal incisions 10 in its circumference, through which the suction or milk can freely pass independently from the position of the plunger. The upper end of the plunger may also have a projection 13 of smaller diameter, as shown in Fig. 2, so that the orifices 16 in the diaphragm lie above the incisions 10 and thereby a free space for suction or milk is created directly beneath the orifices 16 between plunger and plunger cylinder.

As shown in Fig. 3, the plunger may at its upper end be provided with a circular groove 11 from which ports 11$^a$ lead to an annular circumferential groove 12 in the plunger, in which case the lower part of the plunger 9 only is provided with the longitudinal incisions 10.

In the construction shown in Fig. 4, in which the own weight of the plunger, and not the atmospheric pressure, acts upon the diaphragm, the plunger may have any of the afore-described formations, the plunger cylinder 6 being in this case in communication with the suction pipe channel 8 through ports 14 and an annular circumferential groove 15 in the outer wall of the cylinder.

What I claim, is:—

In a milking machine of the suction type, in combination, a milking cup, a cylinder in connection with the latter through a passage-way therein, a suction channel issuing from said cylinder, a plunger in said cylinder having longitudinal incisions therein in communication with said suction channel, a diaphragm in said chamber located to control said passage-way and acted upon by said plunger and having small holes therein in communication with said incisions, an upper and a lower annular inclined bearing surface for said diaphragm forming part of said milking cup and of said cylinder respectively, and means to securely hold said diaphragm in place at its thickened attachment border and to permit a free operation of the same within its working space bounded by said bearing surfaces, substantially as and for the purpose set forth.

In testimony whereof I have hereunto set my hand in the presence of two subscribing witnesses.

AXEL SABROE.

Witnesses:
N. THEO. THRUMM,
EWD. PETERSEN.